C. F. SCOTT.
MEANS FOR MINIMIZING INDUCTIVE INTERFERENCE.
APPLICATION FILED JAN. 2, 1915.
1,196,299.
Patented Aug. 29, 1916.
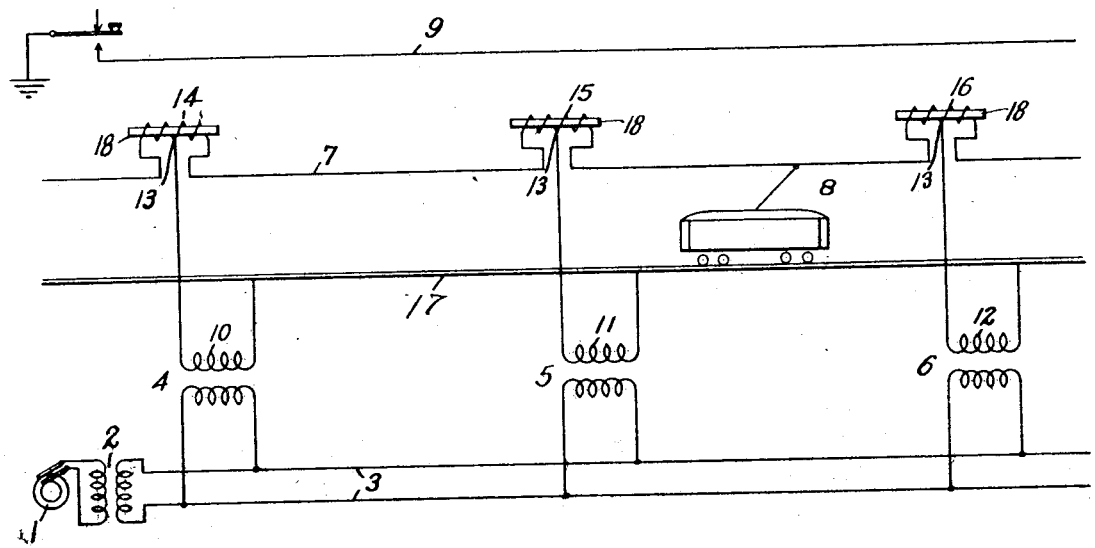
WITNESSES:
Fred H Miller
Geo. W. Hansen.
INVENTOR
Charles F. Scott
BY
Wesley G. Carr
ATTORNEY

UNITED STATES PATENT OFFICE.

CHARLES F. SCOTT, OF NEW HAVEN, CONNECTICUT, ASSIGNOR TO WESTINGHOUSE ELECTRIC AND MANUFACTURING COMPANY, A CORPORATION OF PENNSYLVANIA.

MEANS FOR MINIMIZING INDUCTIVE INTERFERENCE.

1,196,299.

Specification of Letters Patent.    Patented Aug. 29, 1916.

Application filed January 2, 1915.   Serial No. 168.

*To all whom it may concern:*

Be it known that I, CHARLES F. SCOTT, a citizen of the United States, and a resident of New Haven, in the county of New Haven and State of Connecticut, have invented a new and useful Improvement in Means for Minimizing Inductive Interference, of which the following is a specification.

My invention relates to means for minimizing inductive disturbances in electrical circuits, that may be caused by other circuits which are located in proximity thereto.

More particularly, my invention is applicable to the protection of telephone, telegraph and other circuits utilized for the transmission of intelligence which are very susceptible to inductive disturbances and are paralleled, for longer or shorter distances, by circuits utilized for the transmission of power by alternating currents.

When telephone, telegraph and like circuits are in proximity to circuits carrying alternating currents for lighting or power purposes, such as alternating-current railway systems, the electromotive forces induced in the intelligence-transmission circuits disturb and frequently preclude their successful operation. Consider, for example, an alternating-current railway system in which a trolley wire constitutes one of the supply conductors, and the track rails, either alone or in conjunction with the ground, constitute the other supply conductor. When a moving vehicle receives power from the system, a primary circuit, comprising a single convolution of varying length, is formed which may induce alternating electromotive forces in a secondary circuit, as, for instance, a telephone or telegraph circuit that is located partially or wholly in proximity thereto.

The electromotive forces induced in the secondary circuit depend upon the distance between the intelligence-transmission system or secondary circuit and the railway system or primary circuit, the amount and rate of variation of the current flowing in the primary system and the length of the secondary circuit which is in the zones of disturbing influences. If a continuous trolley is employed and it receives current from several substations, then a car or locomotive will receive current, not only from adjacent sub-stations, but also from those which are remote from it. The current from the more distant sub-stations will be parallel to the secondary circuit for a very considerable distance, and will, therefore, induce a much greater electromotive force than would result if the whole, or a much larger proportion, of the current came from adjacent sub-stations.

Disturbances in the secondary, or telegraph circuit may be minimized if the proportion of the current which is supplied by remote sub-stations is reduced. According to my present invention, I propose to minimize the electromotive forces induced in adjacent intelligence-transmission circuits by limiting, to a small amount, the current flow from those sub-stations which are remote from the moving vehicle.

For a better understanding of the nature and scope of my invention, reference may be had to the following description and the accompanying drawing in which the single figure is a diagrammatic representation of a railway system embodying a continuous trolley and equipped with my invention, by means of which the inductive disturbances in a telegraph line paralleling the railway system may be minimized.

An alternating current generator 1, which, for simplicity, is represented as a single-phase generator, supplies power, through a step-up transformer 2, to distributing or feeder conductors 3. A series of sub-stations, represented by transformers 4, 5 and 6, are connected to the high-tension feeders 3 and transfer power at the desired voltage to a continuous trolley conductor 7, which, in turn, furnishes power to a traveling vehicle 8. Located in inductive proximity to the trolley conductor 7, is a conductor 9 of an intelligence-transmission system, such, for example, as a telegraph system.

Secondary windings 10, 11 and 12 of the transformers 4, 5 and 6, respectively, are connected, at convenient intervals, to mid-points or taps 13 of impedance devices or coils 14—15—16. The impedance coils are connected, at corresponding intervals, in series relationship with the trolley conductor 7, thereby dividing the railway system into a plurality of sections over which one or several vehicles may travel. The other terminals of the secondary windings 10, 11 and 12 are connected to the track 17, which comprises the return conductor for the trolley current.

When there are a number of sub-stations feeding the trolley and on the same side of the vehicle, current will be supplied from each of them, the amount of current flowing from remote sub-stations being determined by the relative impedances of the sub-station transformers and of the trolley circuit. If the impedance offered by the trolley to the current flow be low, in comparison with the impedance offered thereto by the transformers, considerable quantities of current may flow from remote sub-stations. As a result of such current flow through a considerable length of the trolley circuit, the electromotive forces induced in the conductor 9 may seriously interfere with the operation of the telegraph circuit. If the vehicle is at the end of the railway system, all of the current supplied to the vehicle flows in one direction and, therefore, no opposing electromotive forces are induced in the conductor 9 such as would result if the vehicle received current from both directions.

In my system, when current is delivered to the moving vehicle from a sub-station immediately adjacent thereto, it will be impeded by only one-half of the impedance offered by the impedance coil directly connected to the said sub-station. The flow of current from more remote sub-stations will be opposed by the impedance offered by the active coils which are inserted in those sections of the trolley along which such currents tend to flow, and the current will, therefore, be impeded and reduced in amount. Each of the coils 14—15—16 is so designed that the impedance offered thereby to the flow of current from the sub-station at which the coil is located, is within permissible limits, but the impedance offered to the flow of current from remote sub-stations is substantially high, thereby precluding the flow of large quantities of current for long distances along the trolley conductor 7. If currents from the transformer 5 are supplied equally, in each direction, to adjacent railway sections, the magnetizing effects of the equal currents flowing in opposite directions around a core 18 of the impedance device 15 will neutralize each other and, therefore, permit the trolley currents to flow unimpeded from the intermediate sub-station in the two adjacent railway sections.

As above mentioned, the inductive disturbances impressed on the conductor 9 are dependent upon the amounts of current flowing in the trolley conductor 7, and also upon the distances over which these currents flow. Therefore, I limit the current flow from remote sub-stations to substantially low values by means of the impedance devices 14—15—16 and thereby decrease the intensity of the disturbing influences upon the intelligence-transmission conductor 9. At the same time, the trolley conductor 7 may be maintained continuous throughout the entire length of the railway system, power being supplied to the trolley conductor by means of a plurality of sub-stations. While the intelligence-transmission circuit may be inductively related to the trolley conductor throughout the length of the railway system, the inductive disturbances imposed thereupon are greatly minimized by means of my invention.

I claim as my invention:

1. Means for minimizing electromagnetic inductive disturbances between parallel conductors comprising an impedance coil connected in series with the inducing conductor, a source of alternating-current supply, and a conductor connected to an intermediate point on the impedance coil whereby one terminal only of said source is connected to said inducing conductor.

2. Means for minimizing electromagnetic inductive disturbances between parallel conductors comprising a plurality of spaced impedance coils connected in series circuit with the inducing conductor, a source of alternating-current supply, and conductors connected to intermediate points of the impedance coils whereby one terminal only of said source is connected at a plurality of points to said inducing conductor.

3. Means for minimizing electromagnetic inductive disturbances between parallel conductors comprising a plurality of spaced impedance coils connected in series relationship with the inducing conductor, a source of alternating-current supply, and conductors connected to mid-points on the impedance coils whereby one terminal only of said source is connected at a plurality of points to said inducing conductor.

4. Means for minimizing electromagnetic inductive disturbances between parallel conductors comprising a plurality of spaced impedance coils which are connected in series circuit with the inducing conductor, intermediate taps upon said impedance coils so spaced as to neutralize substantially the impedance of said coils when equal currents flow therefrom in opposite directions, a source of alternating-current supply, and conductors connected to said intermediate taps whereby one terminal only of said source is connected at a plurality of points to the inducing conductor.

5. Means for minimizing electromagnetic inductive disturbances between parallel conductors comprising a plurality of spaced impedance coils of normally high impedance which are connected in series circuit with the inducing conductor, an intermediate tap upon each of said impedance coils whereby the impedance thereof may be substantially lowered when equal currents flow therefrom in opposite directions, a source of alternating-current supply, and a conductor connected to each of said taps whereby one terminal only of said source may be connected to the inducing conductor.

6. Means for minimizing electromagnetic inductive disturbances between parallel conductors comprising a plurality of spaced impedance coils of normally high impedance which are connected in series circuit with the inducing conductor, an intermediate tap upon each of said impedance coils whereby the impedance thereof may be substantially lowered when currents of predetermined ratio flow therefrom in opposite directions, a source of alternating-current supply, and a conductor connected to each of said taps whereby one terminal only of said source is connected at a plurality of points to the inducing conductor.

In testimony whereof, I have hereunto subscribed my name this 23rd day of Dec. 1914.

CHAS. F. SCOTT.

Witnesses:
B. B. Hines,
M. C. Merz.